US005893490A

United States Patent [19]

Gnyp

[11] Patent Number: 5,893,490
[45] Date of Patent: Apr. 13, 1999

[54] HOSE MOUNT FOR ROBOT ARM DISPENSER SYSTEM

[75] Inventor: Steven M. Gnyp, Grosse Pointe Farms, Mich.

[73] Assignee: Ingersoll-Rand Company, Woodcliff Lake, N.J.

[21] Appl. No.: 08/789,680

[22] Filed: Jan. 27, 1997

[51] Int. Cl.$^6$ .................................................. B65B 1/04
[52] U.S. Cl. ........................ 222/526; 222/527; 901/43; 414/918
[58] Field of Search ............................ 222/526, 527; 901/43; 414/918

[56] References Cited

U.S. PATENT DOCUMENTS

| 4,304,077 | 12/1981 | Muller | 414/918 |
|---|---|---|---|
| 4,373,959 | 2/1983 | Susnjara | 901/43 |
| 5,029,755 | 7/1991 | Schmidt et al. | 901/43 |
| 5,499,745 | 3/1996 | Derian et al. | |

*Primary Examiner*—Steven O. Douglas
*Attorney, Agent, or Firm*—Young & Basile, P.C.

[57] ABSTRACT

A hose mounting arrangement for an adhesive-dispensing robot of the type having a mobile robot arm which applies high viscosity adhesive to a workpiece on an assembly line via a dispenser nozzle on the end of the robot arm. A rigid hose-supporting boom is mounted in cantilever fashion on a rear portion of the robot, such that the forward end of the boom extends to a point proximate and above the robot arm wrist. The boom either carries or forms a rigid adhesive supply conduit. Adhesive from the conduit is carried to the dispenser nozzle on the end of the robot arm by a short length of semi-rigid supply hose connected at one end to the top surface of the forward end of the boom, and extending up, out and around in the form of an inverted loop or bail to the dispenser nozzle. The rigid, cantilever mounting of the first end of the supply hose, its short length, its inverted bail shape, and its rigidity when inflated with adhesive keeps the hose clear of the robot arm throughout the entire range of motion of the robot arm, thereby eliminating interference and hose wear.

23 Claims, 5 Drawing Sheets

HOSE MOUNT FOR ROBOT ARM DISPENSER SYSTEM

FIELD OF THE INVENTION

This invention generally relates to robot arm mounted adhesive/sealant dispensers of the type used to deliver thermally-conditioned, high viscosity adhesives to a workpiece, and more particularly to the supply hose mounting arrangement for such systems.

BACKGROUND OF THE INVENTION

Adhesives and polymer sealants are now widely used to structurally join and seal parts which were previously welded. For example, in the automobile industry they are increasingly used to join and seal automobile bodies and body parts such as doors, hoods and trunks. Johnstone Pump Company of Troy, Mich. has been a leader in adapting large, commercially available six-axis welding robots to apply adhesives and sealants (hereinafter referred to together as adhesives) in precise, preprogrammed patterns to parts as they move down an assembly line. The adhesive must typically be applied in a fairly intricate, tightly controlled pattern, for which the six degrees of motion of these robot arms is well suited.

The adhesives are typically of extremely high viscosity, being nearly rigid at room temperature, and frequently require high operating pressures and thermal conditioning to achieve the desired flow. In a typical arrangement, a dispenser nozzle at the end of the robot arm is supplied by special hose with high pressure adhesive, and with fluids (water, air) needed for thermal conditioning of the adhesive and dispense valve operation.

In the prior art the thick, heavy, semi-rigid adhesive supply hose is coupled to a pressurized adhesive supply aft of the robot arm. The hose then runs along the length of the robot arm to the dispenser end of the arm to supply the nozzle. The wide range of motion of the robot arm requires the supply hose to be long enough to be extended, retracted, twisted, turned and dragged around as the robot arm moves the nozzle over the workpiece. This creates the simultaneous problems of 1) keeping the excess hose mounted reasonably close to the robot arm in the limited space provided on an assembly line, and 2) preventing the hose from being dragged or rubbed against the robot arm and dispenser assembly, which quickly wears out the strongest hoses unless they are provided with cumbersome, expensive protective sheathing.

Another problem encountered when dealing with substantial lengths of hose is the difficulty in pumping the high viscosity adhesive through the hose over long distances. A further problem encountered with hoses long enough to be manipulated through the full range of motion of the robot arm is the rigidity of the hose, particularly when "inflated" with the adhesive, which interferes with the ability of the hose to bend, turn and twist with the robot arm.

A related problem with prior robot arm adhesive dispensers is the location of the adhesive pressure regulator and flow monitor structure relative to the dispensing end of the robot arm. Normally the pressure regulator is mounted to the rear of the robot or on the floor, coupled to the dispenser nozzle through a length of the supply hose. This remote placement of the regulator structure prevents chafing and interference between the hose and dispenser components such as pressure regulators and flow monitors. However, the farther such flow-controlling devices are from the actual dispenser tip or nozzle, the less control the operator has over such critical dispensing factors as adhesive temperature, pressure, and volume.

SUMMARY OF THE INVENTION

The present invention solves the foregoing problems with a simple, rugged, economical hose mounting arrangement, and a close coupled dispenser package compatible with the improved hose mount.

In general the invention is achieved with a rigid, cantilevered hose support boom mounted to a rear segment of the robot such that it is positioned parallel to the robot arm. The boom extends forward over the robot arm to a point adjacent the robot "wrist" at what is typically the "fifth" axis of rotation near the dispenser package on the end of the arm. The boom carries or defines a rigid, high strength flow passage for the adhesive out to the wrist region, such that only a short length of hose is needed to finish carrying the adhesive to the dispenser.

In a further form, the hose is connected to the top side of the boom and extends in an inverted loop or bail out over and around the robot wrist to the dispenser components underneath. The bight or radius of the bail is preferably located over or forward of the wrist which is an optimal arrangement taking advantage of the limited bending radius of the hose, particularly when filled with adhesive, to keep it out and away from all robot arm and dispenser components while simultaneously providing unrestricted motion through the entire range of robot arm and dispenser travel.

In yet a further form, the supply hose is connected to the end of the boom in a swivel fitting.

The boom is hollow and functions as both a rigid hose support and header. In a most preferred form the boom has a coaxial cross-section, with a central adhesive supply conduit and a surrounding water supply jacket or sleeve to apply heated water for thermal conditioning of the adhesive. Both the interior and the exterior of the boom can also be used to provide a convenient raceway for water, air and electrical lines. Alternately, the hose support boom could be used to support a rigid exterior adhesive supply conduit, although the header version with integral internal conduit is preferred.

In a related invention, the end of the robot arm is provided with a close coupled dispenser assembly in which the pressure regulator and flow monitor are mounted directly to the standard transition block and dispense valve/nozzle structure for precise control of the adhesive's volume and pressure at the point of dispensing. This close coupling of the critical flow controlling parts with the dispense valve is made possible by the improved hose mounting arrangement described above, which keeps the hose clear from even the increased dispense structure on the end of the robot arm.

In a preferred embodiment of the close coupled dispenser arrangement, the flow monitor is a jacketed Kuppers-type flow monitor modified according to the present invention to maintain careful temperature control.

These and other features and advantages of the present invention are further explained in the following description of the drawings.

DETAILED DESCRIPTION OF THE ILLUSTRATED EMBODIMENTS

Figure 1:
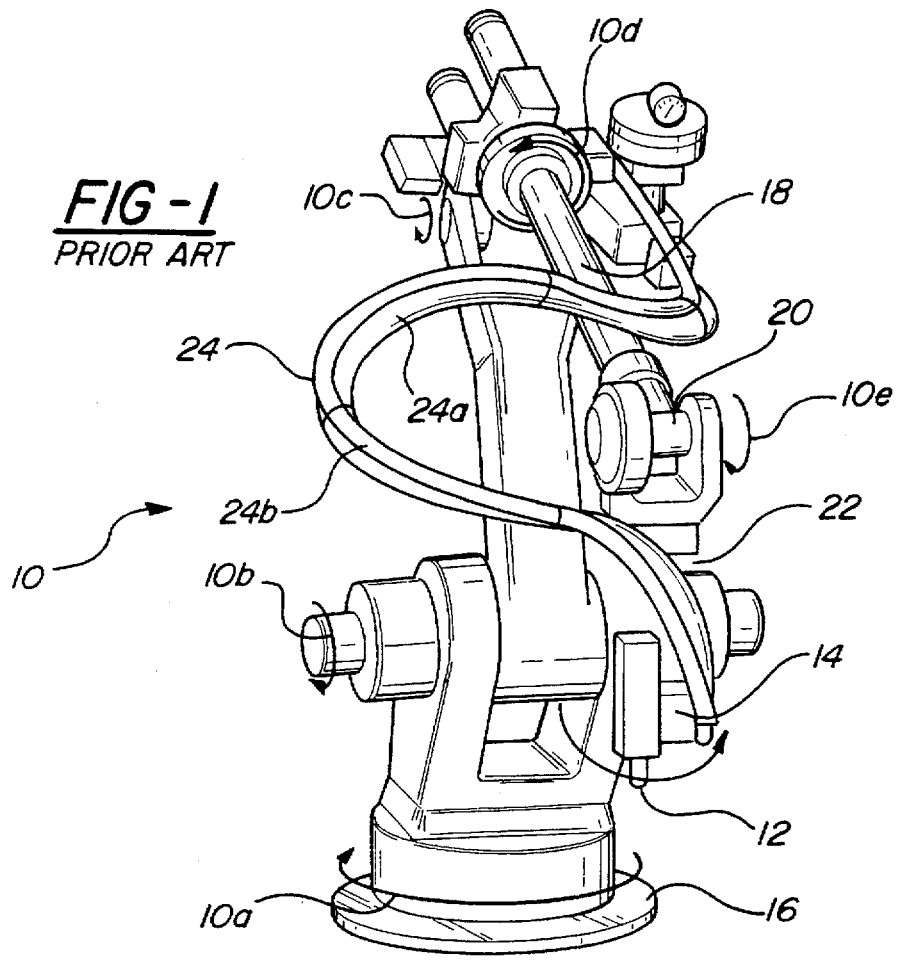
FIG. 1 is a front perspective view of a prior art robot adhesive dispenser and hose mounting arrangement.

Referring first to FIG. 1, a commercially available six-axis robot 10 is shown with a typical prior art hose mounting arrangement. Robot 10 is of the type commonly used for operations such as automated automobile parts assembly, and may be obtained from various companies such as Fanuc, ABB, Kuka, Kawasaki, and Nachi, to name a few. While the illustrated embodiments of the prior art and the invention are described in use on a six-axis robots (with axes 10a, 10b, 10c, 10d, 10e, 10f), it will be apparent to those skilled in the art that the inventive hose mount arrangement is applicable to robots with varying numbers of axes or degrees of motion.

Robot 10 is used to dispense high viscosity, pressurized, temperature conditioned structural adhesive from dispenser nozzle 12 onto a workpiece such as an automobile door panel, hood panel or trunk panel. Adhesive is supplied to nozzle 12 from an offboard supply (not shown) through hose bundle 24 and an "end effector" dispense package 14 comprising a transition block and nozzle mount of known type. Hose bundle 24 usually comprises a large diameter, semi-rigid adhesive supply hose 24a, and water or air hoses 24b to provide temperature conditioning and hydraulic valve power at the transition block 14.

Hose 24 must be long enough to accommodate the movement of the robot as it moves nozzle 12 over a workpiece. The ranges of robot motion encountered by the hose are limited only by the multi-axis design, and can include up/down, horizontal traverse, and rotational motions which extend, retract, twist and turn dispenser package 14 and the attached hose in many directions. The result is that significant portions of hose 24 remain unused and coiled or twisted around the robot arm over much of the robot's operating range, causing several problems. First, the excess hose is inconvenient in the often crowded assembly line environment in which the robot operates. Second, robot movement is often hampered by the adhesive-inflated rigidity of the hose. Perhaps most importantly, the free-hanging hose is frequently rubbed or chafed by the moving robot arm, especially near the dispenser package 14 and robot "wrist" 20. This leads to premature wear of the hose unless expensive protective measures such as hose-cladding are employed, and even then contact between the hose and the robot can cause problems.

Figure 2:
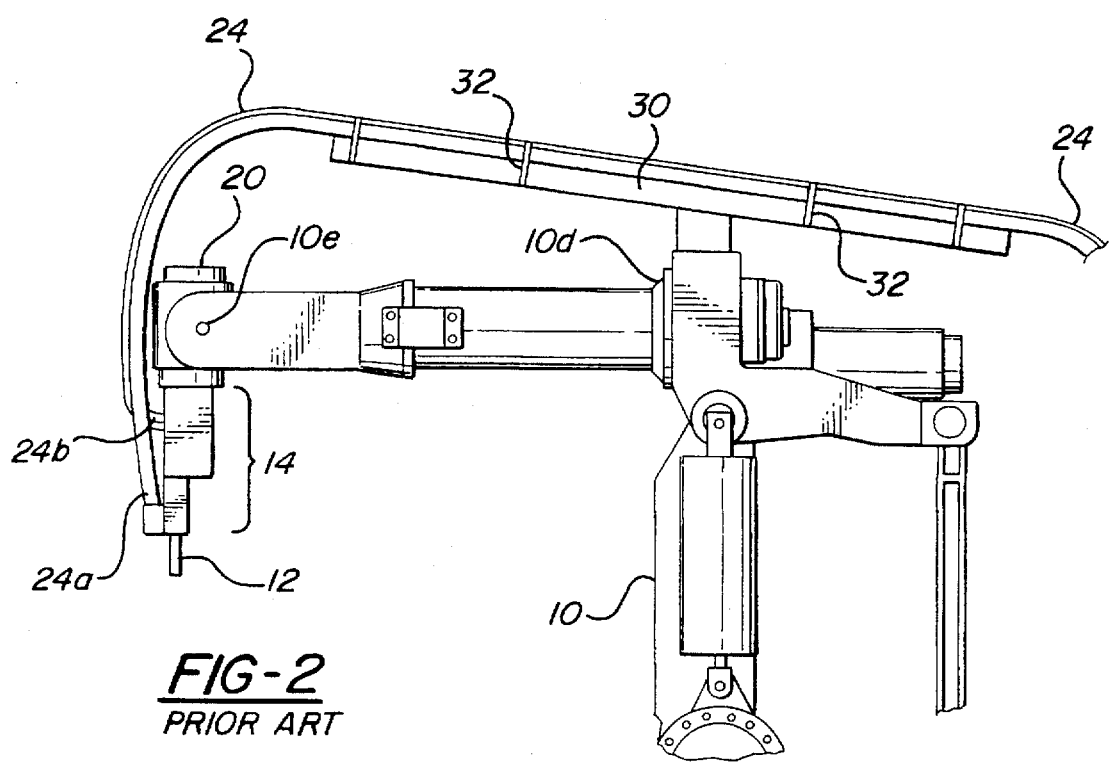
FIG. 2 is a left side view of a different prior art hose mounting arrangement.

FIG. 2 illustrates a prior attempt to solve the hose problems which occur in a setup of the type in FIG. 1. In FIG. 2, the loose length of hose 24 illustrated in FIG. 1 has been restrained by a flat, rectangular support tray 30 to which a major section of hose 24 is fastened by clamps or ties 32. This was found by the inventors of the present application to be only a partial solution, as the downstream end of hose 24 projecting beyond tray 30 still comes into frequent chafing contact with the robot wrist 20, dispenser package 14, and the end of tray 30. This arrangement was additionally awkward and expensive, and did not use the problems inherent in pumping high viscosity adhesive, at high pressure, through a long length of hose which must remain sufficiently flexible to accommodate robot motion.

Figure 3:
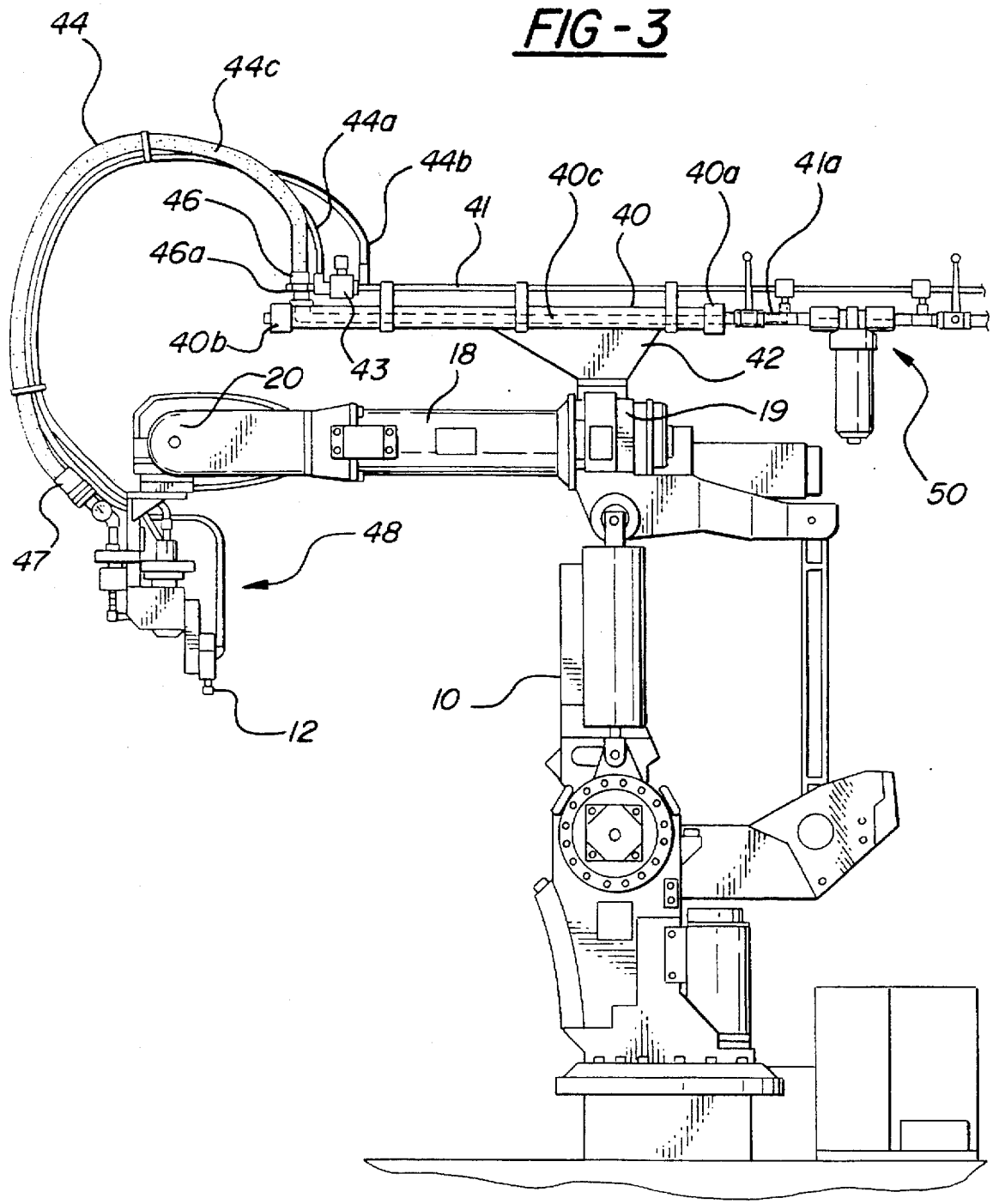
FIG. 3 is a left side view of a hose mounting arrangement according to the present invention.

The present invention solves the problems associated with the above-described prior art. Referring first to FIG. 3, the invention comprises a rigid boom or header 40 fixed by a cantilever bracket 42 mounted on the non-rotating back end 19 of robot arm 18. Boom 40 is rigidly mounted to robot arm 18, preferably in parallel, and spaced for example eight inches from the robot arm so that it follows the movements of robot arm 18 as a parallel extension.

Like most robots of this type, robot 10 has a rotating boom (fourth axis) which prevents bracketing or otherwise mounting the hose or boom directly to the robot arm. Boom 40 is accordingly mounted in cantilever fashion by bracket 42 on the non-rotating back 19 of boom 18.

It is preferred that boom 40 function as a header, with a hollow interior or at least one rigid internal conduit 40c for carrying adhesive pumped from an offboard supply. In FIG. 3, boom 40 is connected at its rear end 40a to an offboard adhesive supply of known type (not shown) by a standard pipe and valving assembly 50. In the illustrated embodiment boom 40 is constructed with an inner passage of one inch high pressure tubing with an outer sleeve of two-inch, Schedule-160 steel pipe. Boom 40 built in this manner provides a rigid, high pressure passage for the adhesive; acts as a raceway for water, air and electrical lines shown at 41; thermally conditions the adhesive with heated water 41a between the inner passage and outer sleeve; and optionally can be used to return water to an offboard control unit.

Besides providing a rigid, high pressure pathway for the adhesive out to a point near the end of the robot arm, boom 40 also provides a rigid mount for a short length of hose 44 which carries the adhesive from end 40b of the boom to the dispenser package 48 and nozzle 12. This significant reduction in hose length (as compared to the full length hose in FIGS. 1 and 2) improves the pumping of adhesive out to the end of the robot arm, simplifies replacement or maintenance of the hose (whose short length is easily removed from and replaced on the end of the robot arm), and further makes possible a further feature of the invention, namely an inverted loop or bail arrangement of the hose over the robot "wrist" 20. As shown in the robot's at rest position in FIG. 3, hose 44 is in the form of a short, inverted, generally U- or J-shaped loop which is bailed out from the top of boom 40 over the end of the robot arm and around to an interference-free connection with dispenser package 48. This arrangement has been found to provide optimal hose flexibility for following the high speed movements of the robot arm, while at the same time maintaining hose clearance or "standoff" from the robot arm and dispenser package components.

Figure 4:
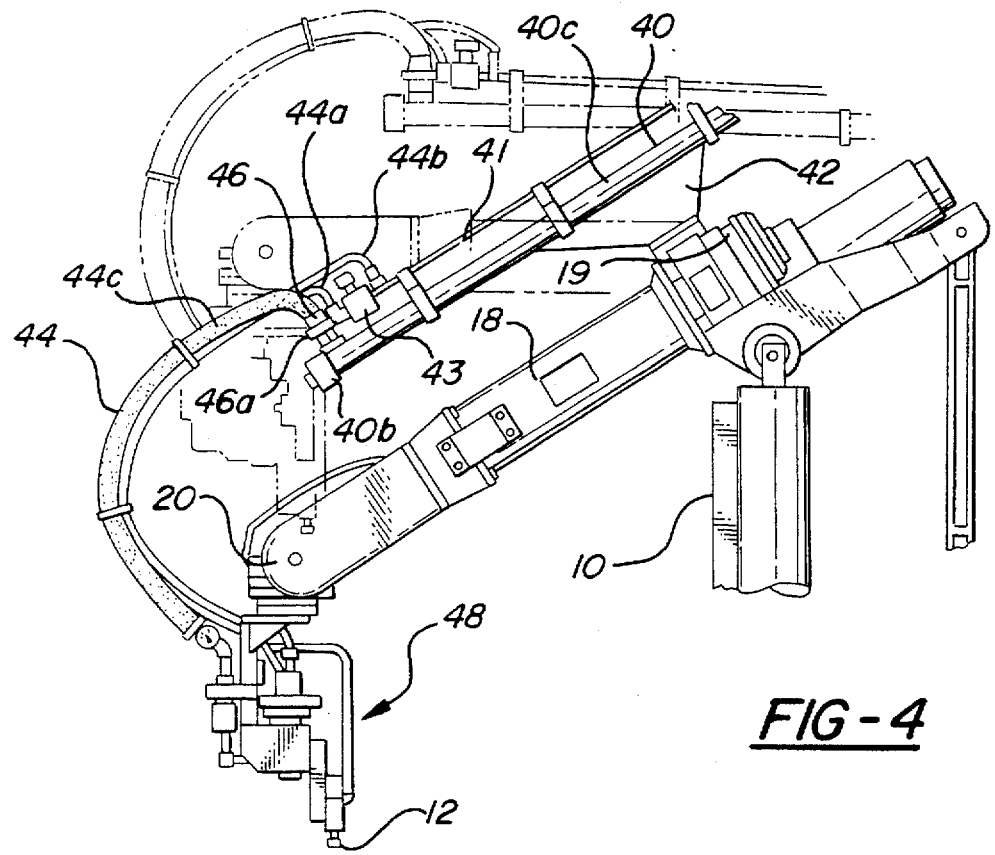
FIGS. 4 and 5 illustrate the inventive hose mounting arrangement of FIG. 3 in various stages of robot arm motion and dispenser position.
Figure 5:
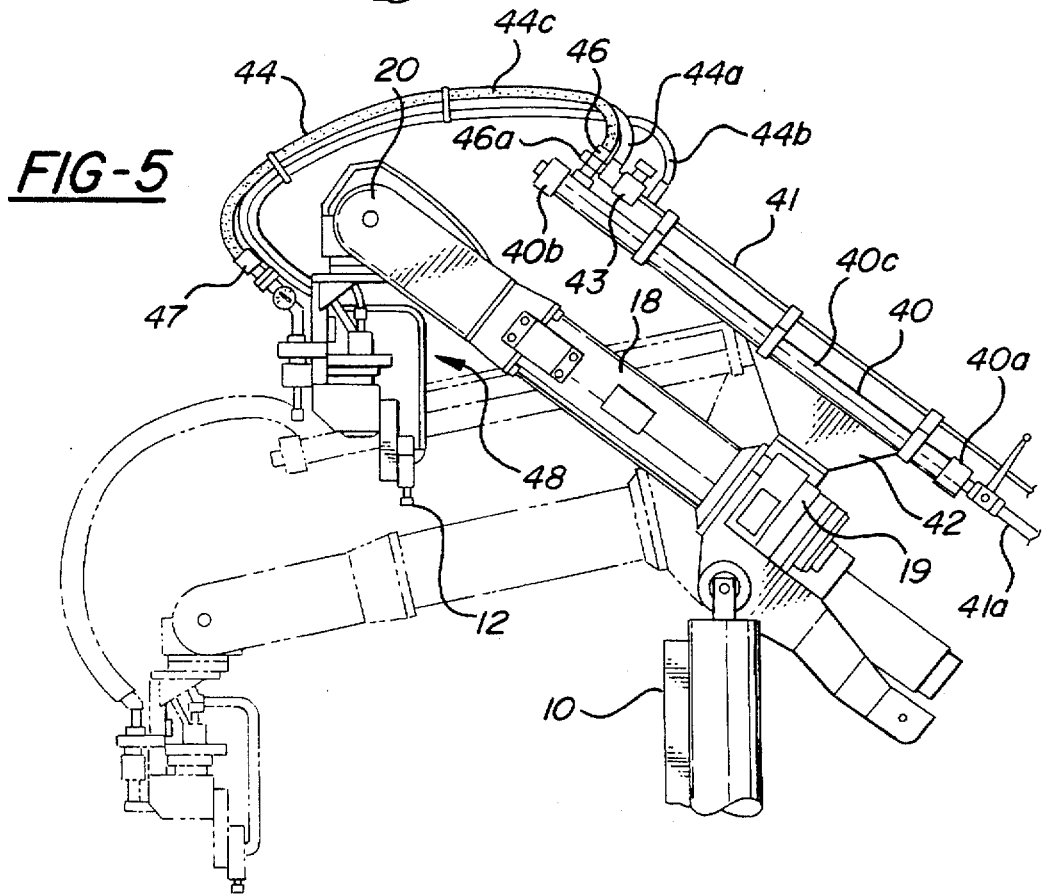

FIGS. 4 and 5 illustrate boom 40 and hose loop 44 through various ranges of robot motion. Whichever way the robot boom 18, wrist 20 or dispense package 48 may move, the inverted hose loop 44 provides the flexibility to match the movements while always maintaining clearance between the hose, the robot arm and the dispense package. It will be apparent to those skilled in the art that the exact dimensions of hose loop 44 will vary depending on the size of the robot arm and dispense package components, as well as the range of motion of the particular robot, but in general the inlet end 46 of the hose at swivel mounting 46a will be spaced above and proximate robot wrist 20, with the hose extending vertically up and then forward to form an inverted bail which curves first up and out, and then down and back in toward dispense package 48 to provide sufficient clearance.

As best shown in FIG. 3, a further advantage of the short length of hose loop 44 is that it becomes sufficiently rigid upon "inflation" with pressurized adhesive to be self-supporting between its inlet end 46 on the boom and its outlet end 47 on dispense package 48.

Still referring to FIG. 3, air and water lines 41 can also be mounted along the top of boom 40 and connected to regulator structure 43 near dispense end 40b of the boom, where they are then connected to flexible air supply and water hoses 44a, 44b which are bundled to adhesive supply hose 44c as part of hose loop 44. Air and water supply lines 44a, 44b supply drive air and temperature conditioning water to dispense 48 in a known manner.

Figure 6:
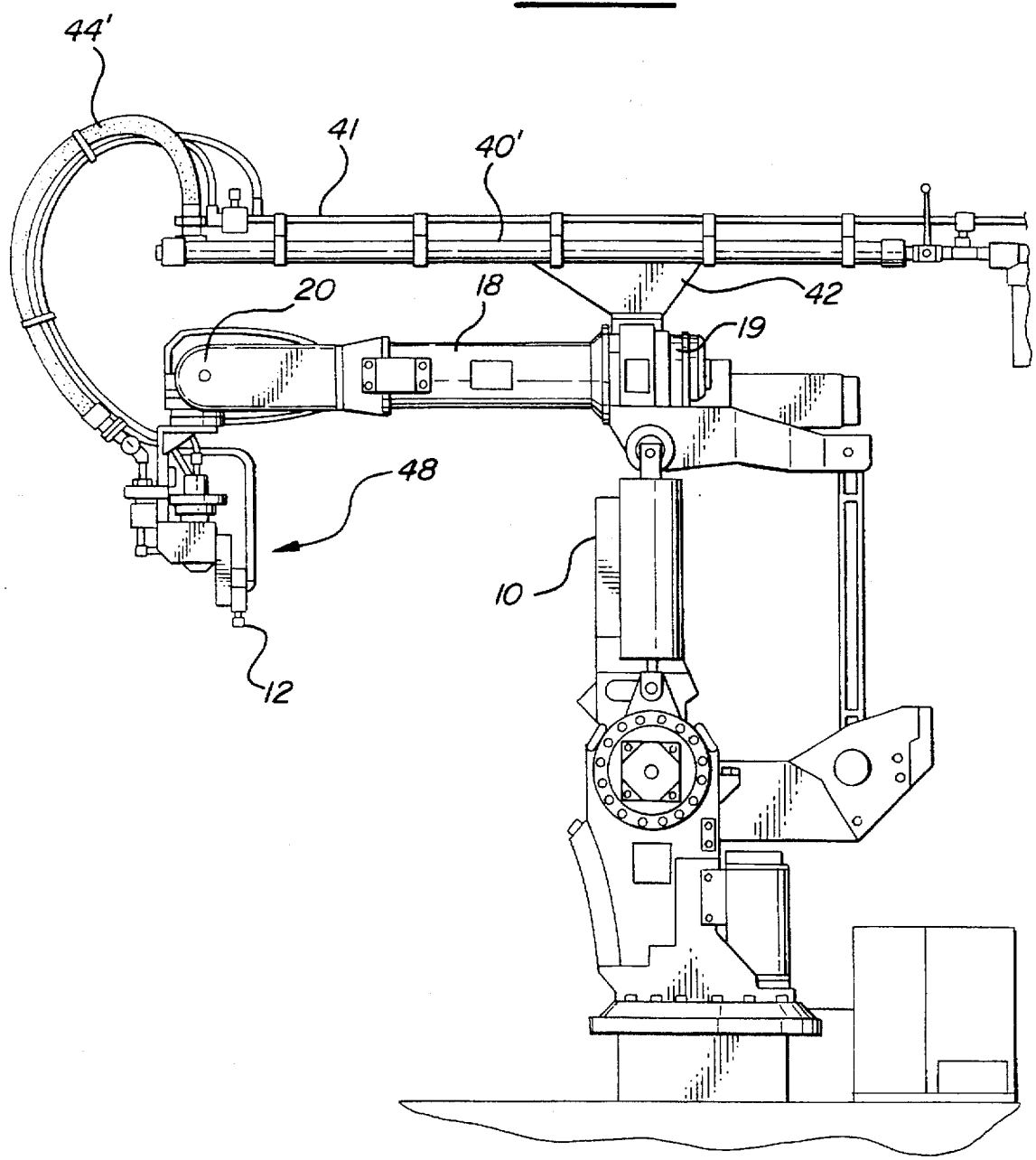
FIG. 6 illustrates an alternate embodiment of the hose mounting arrangement according to the present invention.

Referring to FIG. 6, an alternate embodiment of the present invention is illustrated in a "long" version in which hose-supporting boom 40' extends out over, and optionally slightly past, robot wrist 20. Longer boom 40' allows for the use of a shorter hose loop 44' as illustrated. The longer boom 40' and shorter hose 44' are advantageous when pumping extreme viscosity adhesives, which tend to flow better through rigid conduits such as boom 40' than through hose. Also, some robot applications require a range of travel which makes it advantageous to use a shorter hose 44' to further reduce the possibility of interference between the hose and either the robot or other equipment in the work environment.

In addition to the advantages of short hose length, no-chafe hose mounting, a self-inflating loop or bail which best uses the limited bending radius of the hose, rigid yet interference-free support of the hose near the dispense point, and improved flow of adhesive through a rigid (and optionally thermally-conditioned) boom conduit, the boom provides a fixed, rigid support for ancillary hoses and wiring; and the boom and hose can be conveniently test-mounted offboard the robot with bracket 42, bench-tested, and set up for use in production before it is actually installed on the robot. The inventive hose mounting arrangement of FIGS. 3–6 has made possible the additional invention of an end effector dispense package which is largely self-contained as to pressure, temperature and flow control.

Figure 7:
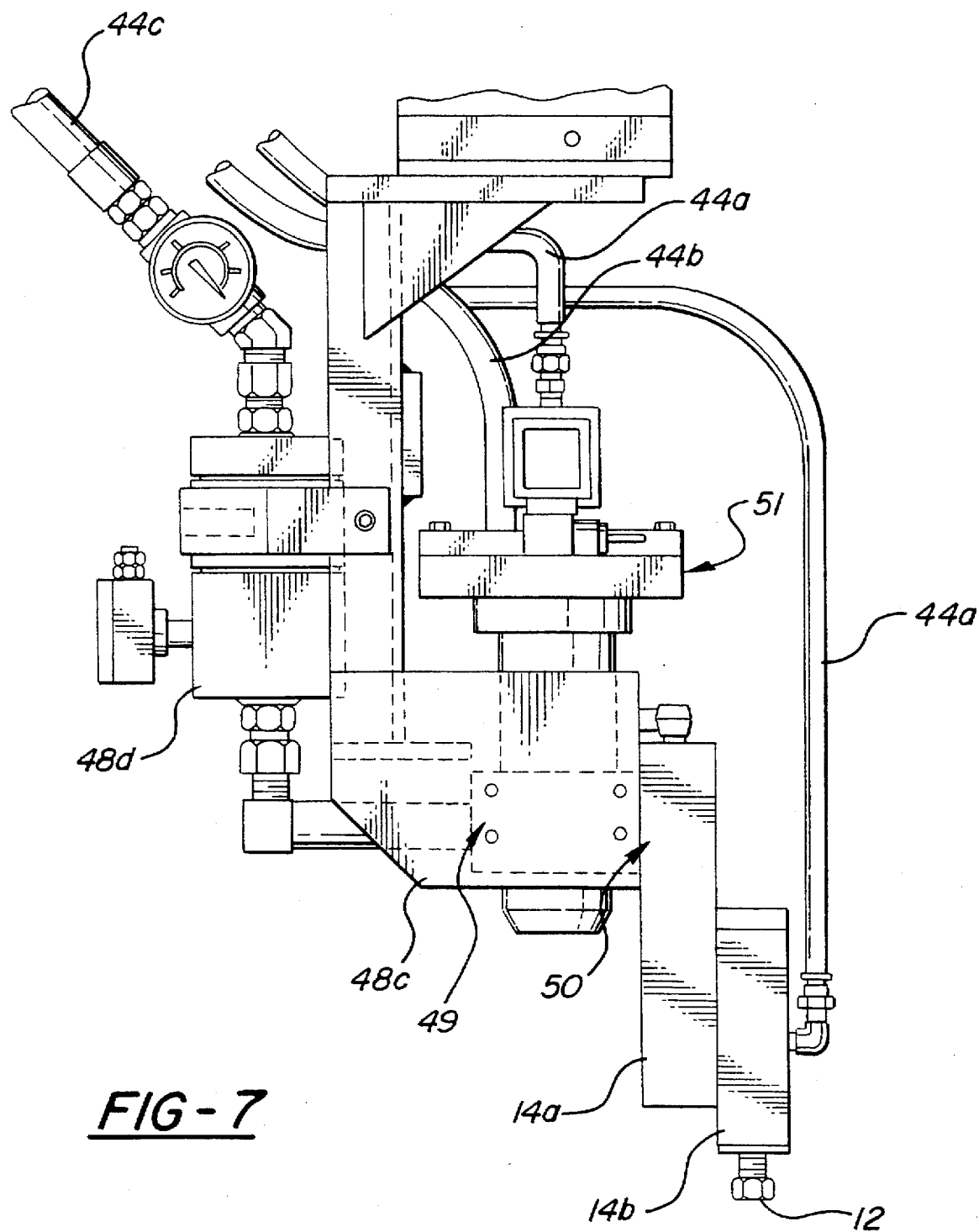
FIG. 7 is a detailed side view of a close coupled dispenser package according to a further aspect of the invention, which package operates in complementary fashion with the inventive hose mounting arrangement.

Referring to FIG. 7, the improved dispense package 48 is illustrated in detail. Because of the risk of hose chafing with prior art hose arrangements, the end effector dispense package was typically limited to minimal structure such as the transition block 14 shown in FIGS. 1 and 2. This left flow monitoring and pressurize regulation either offboard the robot or mounted toward the back of the robot at a considerable distance from the dispense nozzle 12. Because pressure, temperature and flow control over the high viscosity adhesive is critical to proper dispensing in high speed robot applications, there is a distinct advantage in being able to control these factors as close as possible to the dispense point.

In FIG. 7, nozzle 12 is supported on a dispense valve block 14b which receives valve-controlling air from air supply hose 44a. Dispense valve block 14b is connected to transition block 14a which transmits the pressurized adhesive to dispense the valve block 14b, and which further carries temperature conditioning water in and out through a number of internal passages supplied by hose 44b. The transition and dispense valve blocks 14a, 14b (which are essentially the same structure as shown in FIGS. 1 and 2) are in turn connected to a pressure regulator 48c and a volumetric flow monitor 48d. Pressure regulator 48c regulates the pressure of the adhesive being supplied to the transition and dispense valve blocks, and in the illustrated embodiment comprises an air-driven regulator of known type supplied, for example, by air from an external source or a branch 44a of the air supply line.

Volumetric flow monitor 48d is preferably a commercially available Kuppers-type monitor with temperature control via an inventive built-in jacketing. Flow monitor 48d initially receives the adhesive from hose 44c before passing it on through the pressure regulator, transition block and dispense valve block to nozzle 12.

The water passages located throughout the volumetric monitor jacket (48d), the material pressure regulator (48c), the transition block (14a), and the dispense valve (14b), allow the circulation of water that has been conditioned to a single temperature, causing these hardware components, along with the adhesive carried in them under pressure, to be maintained at the same temperature as the conditioned circulating water.

Maintaining an isothermal state in the adhesive causes it's viscosity or resistance in flowing through the hardware components to become repeatable and predictable. Further, selecting an isothermal conditioning temperature somewhat higher than room temperature will allow the adhesive's viscosity to lower and become more liquid, allowing it to pass through the hardware components with less resistance or pressure, to reduce the burden on the adhesive pressure supply pump.

Room temperature adhesive from supply hose 44c entering and then passing through the temperature conditioned volumetric monitor 48D will equalize temperature with the monitor and the temperature conditioned water passing through it. The new stable adhesive temperature will be maintained in the adhesive as it passes through the material pressure regulator 48c, the transition block 14a, the dispense valve 14b, until the adhesive re-enters the ambient room-temperature environment after leaving the dispense nozzle 12.

The rate of flow of adhesive out of nozzle 12 is controlled by the material pressure regulator 48c, which by means of a pneumatically-operated internal valve is able to hold back the higher adhesive supply pressure delivered to the regulator inlet (49), and to maintain a desired lower adhesive pressure at the regulator outlet (50), in proportion to the selected control-air pressure delivered to the pneumatic diaphragm (51) of the material pressure regulator.

From there, the pressure-regulated and temperature-conditioned adhesive may pass through the transition block (14a), and through the dispense valve (14b) if open, to finally exit the dispense system through the nozzle (12).

It will be understand that the illustrated embodiments described above are not intended to limit the invention to those particular embodiments, but merely set forth preferred examples for carrying out the invention. It will be understood by those skilled in the art that variations in boom mounting location, boom length and hose size, hose loop length and bail geometry, and other parameters will depend on the type of robot being used and the work environment, and will fall within the scope of the following claims. It will also be recognized that the invention is applicable to adhesive-dispensing robots used for purposes other then the automobile parts assembly example described above. Accordingly, we claim:

I claim:

1. For use with an adhesive-dispensing robot of the type having a mobile robot arm with a wrist supporting a dispenser, an improved supply hose mounting arrangement comprising:

a rigid, hose-supporting, cantilevered boom mounted on the robot, the boom being spaced above the robot arm and extending from a rear portion of the robot arm to a hose-supporting boom end at a forward portion of the robot arm near the wrist, the boom including a tubular, rigid adhesive conduit through which adhesive flows; and a short length of adhesive supply hose having a first end connected to and supported by the hose-supporting end of the boom substantially perpendicular to the longitudinal axis of the boom to receive adhesive from the rigid adhesive conduit, and a second end connected to the dispenser to supply adhesive to the dispenser from the boom.

2. An apparatus as defined in claim 1, wherein the boom is at least partially hollow to form an internal adhesive conduit.

3. An apparatus as defined in claim 1, wherein the boom is at least partially hollow and includes a separate, internal adhesive conduit and a coaxial fluid passage around the adhesive conduit for thermal conditioning.

4. An apparatus as defined in claim 1, wherein the boom carries an external adhesive conduit.

5. An apparatus as defined in claim 1, wherein the short length of adhesive supply hose extends from a top surface of the boom to the dispenser in the form of an inverted loop or bail.

6. An apparatus as defined in claim 5, wherein the bail is self-supporting when inflated with adhesive.

7. An apparatus as defined in claim 6, wherein the bail is flexible to accommodate the motion of the dispenser relative to the robot arm and boom.

8. An apparatus as defined in claim 7, wherein the bail has a radius sufficient to keep the bail clear of the robot arm.

9. An apparatus as defined in claim 8, wherein the bail has a limited bending radius which maintains clearance between the bail and the robot arm throughout the range of motion of the dispenser relative to the robot arm.

10. An apparatus as defined in claim 5, wherein the boom terminates aft of the robot arm wrist and the bail extends over the wrist.

11. An apparatus as defined in claim 5, wherein the boom terminates above the wrist such that the hose extends upwardly from a top surface of the boom directly above the wrist with the bail located forward of the wrist.

12. An improved hose mounting system for an adhesive-dispensing robot of a type having a mobile robot arm which supports an adhesive dispenser at one end, comprising:

a rigid hose-supporting boom having a rear end, a forward hose-mounting end, and a rigid adhesive conduit for receiving a pressurized supply of adhesive and carrying it to the forward hose mounting end;

means for mounting the boom in cantilever fashion on a portion of the robot such that the forward end of the boom is located proximate and above the dispenser end of the robot arm; and a short length of adhesive supply hose connected to and supported by an upper surface of the forward end of the boom to receive the pressurized adhesive from the rigid conduit, the hose extending upwardly and forwardly from the top surface of the boom substantially perpendicular to the longitudinal axis of the boom to form an inverted loop or bail when a second lower end of the hose is attached to a dispenser on the end of a robot arm.

13. Apparatus as defined in claim 12, wherein the means for mounting the boom on the robot is capable of being mounted on a testing facility offboard the robot.

14. Apparatus as defined in claim 12, wherein the boom has a first shorter length such that the forward end extends to a point rearwardly of the dispenser end of the robot arm, and the hose is of a first longer length to extend over and around the dispenser end of the robot arm.

15. Apparatus as defined in claim 12, wherein the boom has of a second longer length such that the forward end of the boom extends at least to the dispenser end of the robot arm, and the hose is of a second shorter length with the bail located forwardly of the dispenser end of the robot arm.

16. Apparatus as defined in claim 12, wherein the boom is at least partially hollow and includes an internal rigid adhesive conduit.

17. Apparatus as defined in claim 12, wherein the first end of the hose is connected to the rigid adhesive conduit with a swivel fitting.

18. Apparatus as defined in claim 12, wherein the boom includes means for rigidly supporting exterior supply lines along its length.

19. For use with an adhesive-dispensing multi-axis robot of the type having a mobile robot arm with a wrist supporting an adhesive dispenser, an improved supply hose mounting arrangement comprising:

a rigid hose-supporting boom mounted on a rear portion of the robot in cantilever fashion, the boom having a rear adhesive-receiving end and a forward hose-supporting end extending along and above the robot arm to a point proximate and above the robot arm wrist, the boom including an internal rigid adhesive conduit through which the adhesive flows extending between the rear and forward ends of the boom, the supply hoses being mounted directly to the boom;

a short length of adhesive supply hose having a first end mounted on a top surface of the forward end of the boom and connected to the internal rigid adhesive conduit, the hose extending vertically from the top surface of the boom and curving forwardly to form an inverted loop or bail, the hose having a second end connected to the dispenser below the robot arm wrist, such that the hose stands clear of the robot arm when inflated with adhesive.

20. An apparatus as defined in claim 19, wherein the forward end of the boom terminates aft of the robot arm wrist, and the hose bail extends over and around the wrist.

21. An apparatus as defined in claim 19, wherein the forward end of the boom terminates at or beyond the wrist, and the hose bail is located forward of the robot wrist.

22. For use with an adhesive-dispensing robot of the type having a mobile robot arm with a wrist supporting a dispenser, an improved supply hose mounting arrangement comprising:

a rigid, hose-supporting boom mounted on the robot, the boom being spaced above the robot arm and extending from a rear portion of the robot arm to a hose-supporting boom end at a forward portion of the robot arm near the wrist, the boom including a rigid adhesive conduit and a coaxial fluid passageway around the adhesive conduit for thermal conditioning; and a short length of adhesive supply hose having a first end connected to the hose-supporting end of the boom to receive adhesive from the rigid adhesive conduit, and a second end connected to the dispenser to supply adhesive to the dispenser from the boom.

23. An improved hose mounting system for an adhesive-dispensing robot of a type having a mobile robot arm which supports an adhesive dispenser at one end, comprising:

a rigid support boom having a rear end, a forward hose-mounting end, and a rigid adhesive conduit for receiving a pressurized supply of adhesive and carrying it to the forward hose mounting end;

means for mounting the boom in cantilever fashion on a portion of the robot such that the forward end of the boom is located proximate and above the dispenser end of the robot arm; and a short length of adhesive supply hose connected to an upper surface of the forward end of the boom using a swivel mounting to receive the pressurized adhesive from the rigid conduit, the hose extending upwardly and forwardly from the top surface of the boom to form an inverted loop or bail when a second lower end of the hose is attached to a dispenser on the end of a robot arm.

* * * * *

UNITED STATES PATENT AND TRADEMARK OFFICE
CERTIFICATE OF CORRECTION

PATENT NO : 5,893,490
DATED : April 13, 1999
INVENTOR(S): Steven Gnyp

It is certified that error appears in the above-identified patent and that said Letters Patent are hereby corrected as shown below:

Column 2, line 17, after "out" insert --,--.

Column 3, line 64, change "use" to --solve--.

Column 5, line 11, after "dispense" insert --package--.

Column 5, line 35, please make the sentence beginning with "The inventive hose mounting..." into a separate paragraph.

Column 5, line 56, after "dispense" delete "the".

Column 6, line 9, after "(14b)" delete the ",".

Column 6, line 15, change "it's" to --its--.

Column 7, line 2, after "a" delete "tubular,".

Column 7, line 12, after "wherein" insert --a hollow interior portion of--.

Column 7, line 13, delete "is at least partially hollow to form an internal" and insert --defines the rigid--.

Column 7, lines 15 and 16, delete "boom is at least partially hollow and includes" and insert --rigid adhesive conduit comprises--.

Column 7, line 17, after "conduit" delete "and" and insert --in a hollow interior portion of the boom, and the hollow interior portion of the boom defines--.

Column 7, line 17, after "the" insert --separate, internal--.

UNITED STATES PATENT AND TRADEMARK OFFICE
CERTIFICATE OF CORRECTION

PATENT NO : 5,893,490
DATED : April 13, 1999
INVENTOR(S): Steven Gnyp

It is certified that error appears in the above-identified patent and that said Letters Patent are hereby corrected as shown below:

Column 7, lines 19 and 20, after "the" delete "boom carries" and insert --the rigid adhesive conduit comprises--.

Column 7, line 20 after "conduit" insert --carried by the boom--.

Column 7, line 23, delete "loop or".

Column 7, line 36, after "wherein the" insert --hose-supporting end of the--.

Column 7, line 39, after "wherein the" insert --hose-supporting end of the--.

Column 7, line 40, after "above" insert --or beyond--.

Column 7, line 41 after "boom" delete "directly" and after "above" insert --or beyond--.

Column 7, line 47, after "hose-" delete "mounting" and insert --supporting--.

Column 7, line 49, after "hose" delete "mounting" and insert -- -supporting--.

Column 7, lines 50-51, after "on" delete "a portion of".

Column 7, line 51, after "forward" insert --hose-supporting--.

Column 7, line 55, after "forward" insert --hose-supporting--.

Column 7, line 56, after "rigid" insert --adhesive--.

Column 7, line 58, delete "top" and insert --upper--.

UNITED STATES PATENT AND TRADEMARK OFFICE
CERTIFICATE OF CORRECTION

PATENT NO : 5,893,490
DATED : April 13, 1999
INVENTOR(S): Steven Gnyp

It is certified that error appears in the above-identified patent and that said Letters Patent are hereby corrected as shown below:

Column 7, line 60, after "inverted" delete "loop or".

Column 7, line 61, after "of" delete "a" and insert --the--.

Column 7, line 67, after "shorter" insert --boom-- and after "forward" insert --hose-supporting--.

Column 8, line 2, after "longer" insert --hose-- and after "length" delete "to" and insert --such that the bail--.

Column 8, line 2, delete "extend" and insert --extends-- and after "over" delete "and around".

Column 8, line 5, after "has" delete "of", after "longer" insert --boom--, and after "forward" insert --hose-supporting--.

Column 8, line 7, after "shorter" insert --hose--.

Column 8, line 10, after "and" delete "includes an internal" and insert --the--.

Column 8, line 11, after "conduit" insert --is defined inside the boom--.

Column 8, line 13, after "the" delete "rigid adhesive conduit" and insert --upper surface of the boom--.

Column 8, line 29, after "rear" insert --adhesive-receiving end--, after "and" insert --the--, after "forward" insert --hose-supporting--.

Column 8, line 29, change "ends" to --end-- and after "boom" delete ", the supply hoses being mounted directly to the boom".

UNITED STATES PATENT AND TRADEMARK OFFICE
CERTIFICATE OF CORRECTION

PATENT NO : 5,893,490
DATED : April 13, 1999
INVENTOR(S): Steven Gnyp

It is certified that error appears in the above-identified patent and that said Letters Patent are hereby corrected as shown below:

Column 8, line 42, after "over" delete "and around".

Column 8, line 52, after "robot" delete "arm".

Column 8, line 54, after "rigid" insert --internal--.

Column 8, line 55, after "the" insert --rigid internal--.

Column 8, line 59, after "rigid" insert --internal--.

Column 8, line 62, after "the" delete "boom" and insert --rigid internal adhesive conduit--.

Column 8, line 67, after "hose-" delete "mounting" and insert --supporting--.

Column 9, line 2, after "hose" delete "mounting" and insert -- -supporting--.

Column 9, lines 3 and 4 after "on" delete "a portion of".

Column 9, line 8, after "forward" insert --hose-supporting--.

Column 10, line 2, after "rigid" insert --adhesive--.

Column 10, line 4, after "inverted" delete "loop or".

Column 10, line 5, after "to" delete "a" and insert --the-- and after "of" delete "a" and insert --the--.

UNITED STATES PATENT AND TRADEMARK OFFICE
CERTIFICATE OF CORRECTION

PATENT NO : 5,893,490
DATED : April 13, 1999
INVENTOR(S): Steven Gnyp

It is certified that error appears in the above-identified patent and that said Letters Patent are hereby corrected as shown below:

Please add the following new claims:

--24. An apparatus as defined in claim 1, wherein the boom is mounted on the robot to move in parallel with the robot arm.--

--25. An apparatus as defined in claim 12, wherein the boom is mounted on the robot to move in parallel with the robot arm.--

--26. An apparatus as defined in claim 19, wherein the boom is mounted on the rear portion of the robot to move in parallel with the robot arm.--

--27. An apparatus as defined in claim 22, wherein the boom is mounted on the robot to move in parallel with the robot arm.--

--28. An apparatus as defined in claim 23, wherein the boom is mounted on the robot to move in parallel with the robot arm.--

--29. An apparatus as defined in claim 24, wherein the boom is mounted on a rear portion of the robot arm.--

--30. An apparatus as defined in claim 29, wherein the forward portion of the robot arm is a rotating portion, and the rear portion of the robot arm on which the boom is mounted is a non-rotating portion.--

--31. An apparatus as defined in claim 25, wherein the boom is mounted in cantilever fashion on a rear portion of the robot arm.--

UNITED STATES PATENT AND TRADEMARK OFFICE
CERTIFICATE OF CORRECTION

PATENT NO. : 5,893,490
DATED : April 13, 1999
INVENTOR(S) : Steven Gnyp

It is certified that error appears in the above-identified patent and that said Letters Patent is hereby corrected as shown below:

--32. The apparatus of claim 31, wherein the dispenser end of the robot arm is a rotating portion, and the rear portion of the robot arm on which the boom is mounted in cantilever fashion is a non-rotating portion.--

--33. An apparatus as defined in claim 19, wherein the rear portion of the robot on which the boom is mounted in cantilever fashion is a rear portion of the robot arm.--

--34. An apparatus as defined in claim 33, wherein the portion of the robot arm with a wrist supporting an adhesive dispenser is a rotating portion of the robot arm, and the rear portion of the robot arm on which the boom is mounted in cantilever fashion is a non-rotating portion.--

--35. An apparatus as defined in claim 22, wherein the boom is mounted on a rear portion of the robot arm.--

--36. An apparatus as defined in claim 35, wherein the forward portion of the robot arm is a rotating portion, and the rear portion of the robot arm on which the boom is mounted is a non-rotating portion.--

--37. An apparatus as defined in claim 23, wherein the boom is mounted in cantilever fashion on a rear portion of the robot arm.--

UNITED STATES PATENT AND TRADEMARK OFFICE
CERTIFICATE OF CORRECTION

PATENT NO. : 5,983,490  
DATED : April 13, 1999  
INVENTOR(S) : Steven Gnyp

Page 7 of 7

It is certified that error appears in the above-identified patent and that said Letters Patent is hereby corrected as shown below:

--38. An apparatus as defined in claim 37, wherein the dispenser end of the robot arm is a rotating portion, and the rear portion of the robot arm on which the boom is mounted in cantilever fashion is a non-rotating portion of the robot arm.--

Signed and Sealed this

Sixteenth Day of May, 2000

Attest:

Q. TODD DICKINSON

*Attesting Officer*    *Director of Patents and Trademarks*